US008955408B2

(12) United States Patent
Tarver

(10) Patent No.: US 8,955,408 B2
(45) Date of Patent: Feb. 17, 2015

(54) CABLE CONNECTOR

(75) Inventor: Graham Tarver, Rugby (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 1070 days.

(21) Appl. No.: 12/934,854

(22) PCT Filed: Mar. 24, 2009

(86) PCT No.: PCT/IB2009/051229
§ 371 (c)(1),
(2), (4) Date: Dec. 2, 2010

(87) PCT Pub. No.: WO2009/118686
PCT Pub. Date: Oct. 1, 2009

(65) Prior Publication Data
US 2011/0100150 A1    May 5, 2011

(30) Foreign Application Priority Data
Mar. 25, 2008  (GB) ................................. 0805330.8

(51) Int. Cl.
*F16C 1/10* (2006.01)
*F16H 63/34* (2006.01)

(52) U.S. Cl.
CPC ............ *F16H 63/3491* (2013.01); *F16C 1/101* (2013.01)
USPC ...................................... 74/502.4

(58) Field of Classification Search
USPC .................. 74/500.5, 502.4, 502.6
See application file for complete search history.

(56) References Cited

U.S. PATENT DOCUMENTS

| 4,526,057 | A | | 7/1985 | Mochida et al. |
| 5,039,138 | A | * | 8/1991 | Dickirson ................... 285/314 |
| 5,575,180 | A | * | 11/1996 | Simon ........................ 74/502.4 |
| 5,655,415 | A | * | 8/1997 | Nagle et al. ................. 74/502.6 |
| 5,816,109 | A | | 10/1998 | Dege |
| 6,279,415 | B1 | * | 8/2001 | Chance et al. ........... 74/501.5 R |
| 6,631,654 | B2 | | 10/2003 | Ehrmaier et al. |
| 7,609,924 | B2 | * | 10/2009 | Anderson et al. ............. 385/100 |

FOREIGN PATENT DOCUMENTS

DE    10315692    11/2004

OTHER PUBLICATIONS

International Search Report for corresponding patent application No. PCT/IB2009/051229, mailed Jul. 17, 2009, 2 pages.

* cited by examiner

*Primary Examiner* — Vicky Johnson
(74) *Attorney, Agent, or Firm* — Shumaker & Sieffert, P.A.

(57) ABSTRACT

A control cable system for interconnecting an actuator (21) with a slave device (12) and comprising two Bowden cables (24,25) each comprising a sleeve (31, 33) and inner traction cord (32, 34) and a cable connector (26) for interconnecting the two cables, one cable (24) connecting to the actuator (21) and the second cable (25) connecting to the slave device (12), the connector (26) holding the two sleeves (31, 33) in a fixed relationship with the two traction cords (32, 34) being interconnected via a connecting device (29) which permits movement of the slave device (12) and second traction cord (33) without transmission of said movement to the said one traction cord and which transmits movement from the actuator (21) to said second traction cord (33).

20 Claims, 3 Drawing Sheets

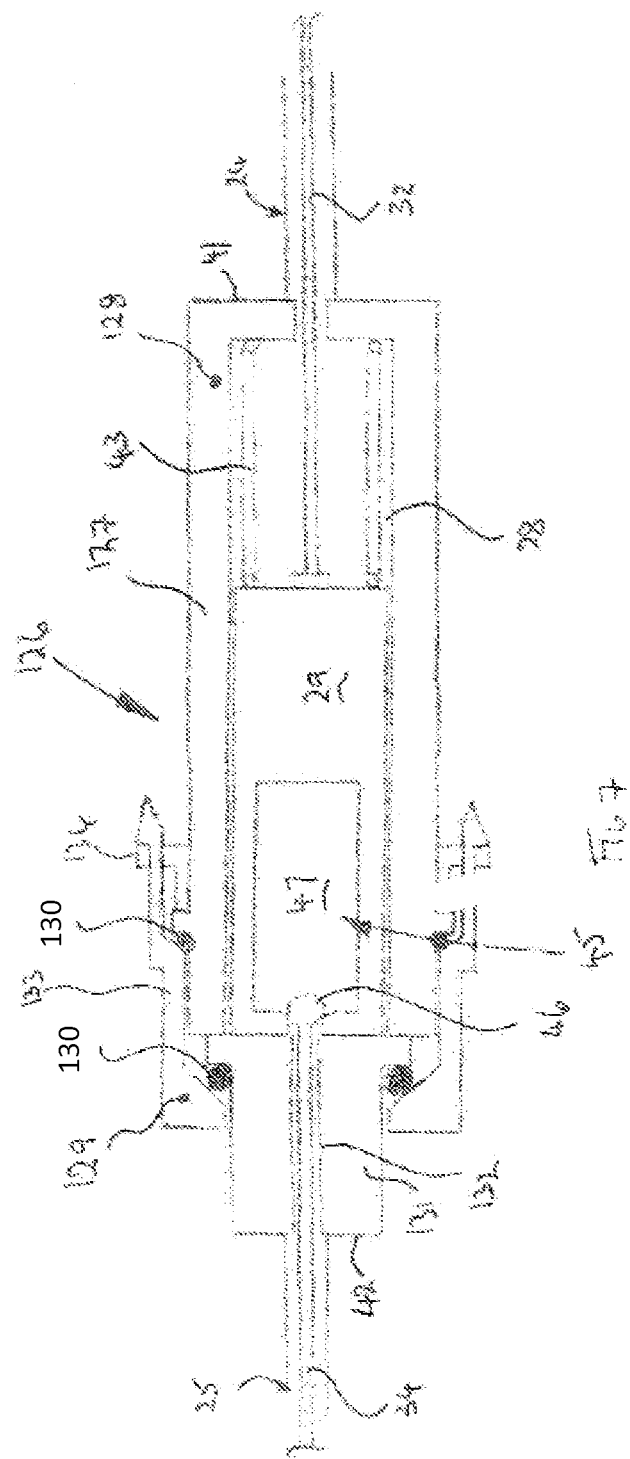

CABLE CONNECTOR

FIELD

This invention relates to a cable connector for connecting together two lengths of cable to transmit movement from a control actuator to a slave device.

BACKGROUND OF THE INVENTION

Motor vehicles having automatic transmission systems including a driver operable control for placing the vehicle in Drive, Neutral, Reverse and Park modes. Conventionally, the transmission is operated by a driver operable gear shift lever which is connected to the transmission by mechanical means such cables or rods. Recently, the mechanical means are being replaced by electronic controls (sometimes known as 'e-shift') in which the drive modes are selected by a driver and an electrical control signal is used to operate electro-hydraulic devices in the transmission to engage and disengage selected drive modes. The park mode, when engaged, may also be disengaged in emergency conditions by a control system comprising a driver operable control lever within the vehicle which is connected via a Bowden cable to a release lever typically mounted externally of the transmission housing. The release lever on the transmission housing is rotated by elements within the transmission when the park mode is selected and de-selected. U.S. Pat. No. 6,631,654 discloses an automatic transmission system in which the emergency control lever is connected to the release lever by a Bowden cable and free play is provided between the lever and cable allowing the release lever to rotate without movement being transmitted to the cable. The Bowden cable can engage the release lever only when the control lever is operated. The free play area in the above emergency park release system is typically exposed, and also requires a certain amount of clearance to ensure the cable does impede the transmission lever under normal usage.

The present invention provides a cable connector for interconnecting two Bowden control cables and which provides for an emergency park release system in which the above disadvantages have been eliminated.

STATEMENTS OF INVENTION

According to a first aspect of the present invention, there is provided a cable connector for interconnecting two Bowden cables one connected to an actuator and the second to a slave and each comprising a sleeve and inner traction cord, the connector in use holding the two sleeves in a fixed relationship relative to each other with the traction cords being interconnected via a connecting device which permits limited linear movement of said second traction cord in one direction without transmission of said linear movement to said one traction cord and transmits linear movement of said one traction cord to the second traction cord in said one direction.

Preferably the connector comprises an elongate body with a longitudinally extending recess therein and abutment surfaces for engagement with the sleeves of the two cables such that the body holds the two sleeves in fixed relationship, a slider fixed to the first traction cord is reciprocable within the recess and is biased away from the sleeve of said one cable, the slider engaging the second traction cord via a lost motion connection.

The slider is biased towards the sleeve of the second cable by a spring arranged within the recess coaxially with the slider and concentrically of the first traction cord. The slider may be formed of a suitable die-cast material.

The slider is provided in one end portion adjacent the second sleeve with a longitudinally extending blind cavity having a passageway accommodating the second traction cord and a detent which in use loosely engages with a fixing attached to the adjacent end of the second traction cord.

The detent comprises a shoulder formed around the inner end of the passageway.

The slider may be provided at its other end portion with a further passageway accommodating in use the first traction cord and a further cavity for snugly accommodating a fixing attached to the end of the first traction cord. Alternatively the slider may be formed directly onto the first traction cord.

The body may comprise a coffin-like body having a removable lid for the attachment of traction cords to the slider. Alternatively the body may comprise interconnecting male/female body portions.

According to a second aspect of the present invention there is provided a control cable system comprising two Bowden cables each comprising a sleeve and inner traction cord and having a cable connector according to the first aspect of the present invention interconnecting the two cables.

Such a control cable system may be used as an emergency park mode release cable assembly for a motor vehicle having an automatic transmission.

A third aspect of the present invention provides a release system for disengaging the park mode of an automatic transmission of a motor vehicle and comprising: a release lever on the transmission which is rotatable between park mode engaged and disengaged conditions, and a control actuator which is connected to the release lever by a cable assembly according to the second aspect of the invention.

For some vehicles it may be advantageous to split the park mode emergency release cable into an assembly comprising two cables with a connector therebetween especially in areas where components are tightly packaged. The connector may be mounted to the transmission housing or may be remote therefrom.

DESCRIPTION OF THE DRAWINGS

The invention will be described by way of Example and with reference to the accompanying drawings in which:

FIG. 7 is a drawing of a second connector according to the present invention.

DETAILED DESCRIPTION OF THE INVENTION

Figure 1:
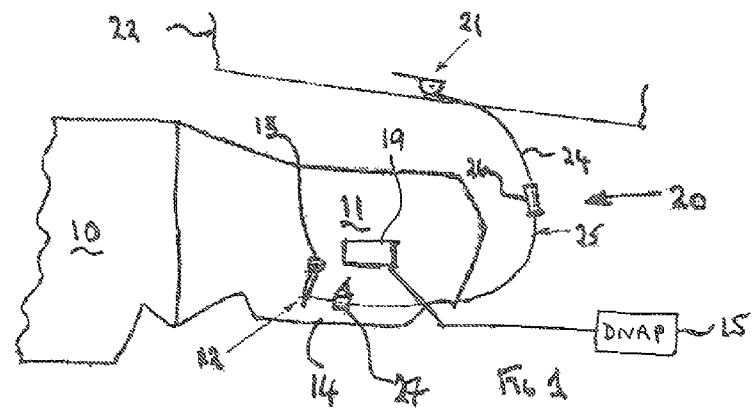
FIGS. 1-3 are schematic drawings of a vehicle transmission emergency park release system according to the present invention in different operating modes.

With reference to FIG. 1 there is shown a vehicle 'e-shift' automatic transmission 11 mounted on the rear of a vehicle engine 10. The transmission 11 has a release lever 12 mounted externally of the transmission housing 14 and attached to a shaft 13 which rotates when the parking brake is engaged and disengaged on a driver controlled selector. The movement of the shaft 13 causes the lever 12 to rotate backwards and forwards. In the present embodiment the lever 12 is shown in FIG. 1 as rotated forward with the parking brake engaged in the park mode with power off and in FIG. 2 rotated backward with the parking brake disengaged and the transmission in drive. The 'e-shift' transmission includes a driver operable electrical transmission control 15 connected to an electro-hydraulic device 19 housed inside the transmission housing 14. The control 15 selects the mode of operation of the transmission using electrical signals to prompt a mode change via electro-hydraulic device 19. When electrical power is off, the transmission 11 will default to a park mode as shown.

Figure 3:
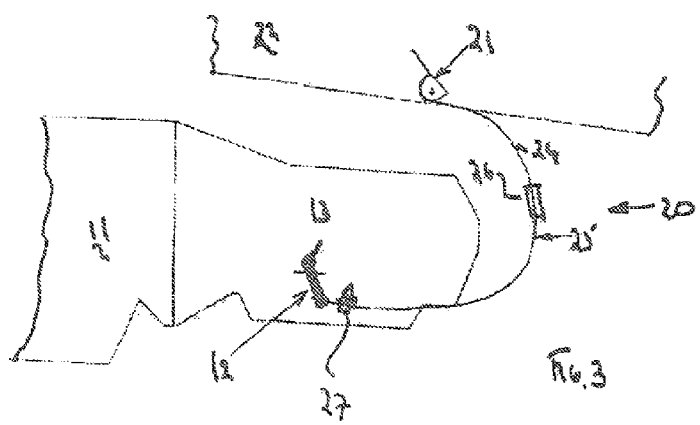

If the vehicle needs to be moved during assembly or repair, when no power is connected, or during and electrical breakdown, a manually operable emergency park release (EPR) cable assembly 20 is provided. The EPR cable assembly 20 connects a control actuator 21 in the vehicle passenger compartment with the release lever 12. The actuator 21, preferably a hand operable lever, when operated, pulls the release lever 12 which in turn causes the transmission to change out of park mode. This condition is shown in FIG. 3.

Figure 2:
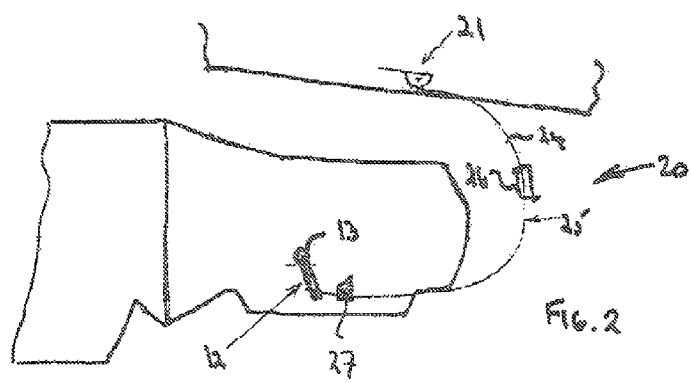

With reference now to FIG. 2, the control actuator 21 is shown in its normal 'at-rest' position with the transmission 11 in drive mode in which the release lever 12 is moved backward by the transmission when the parking brake is disengaged. The EPR cable assembly 20, according to the present invention, helps prevent movement of the release lever 12 from being impeded during normal operation of the transmission.

Figure 4:
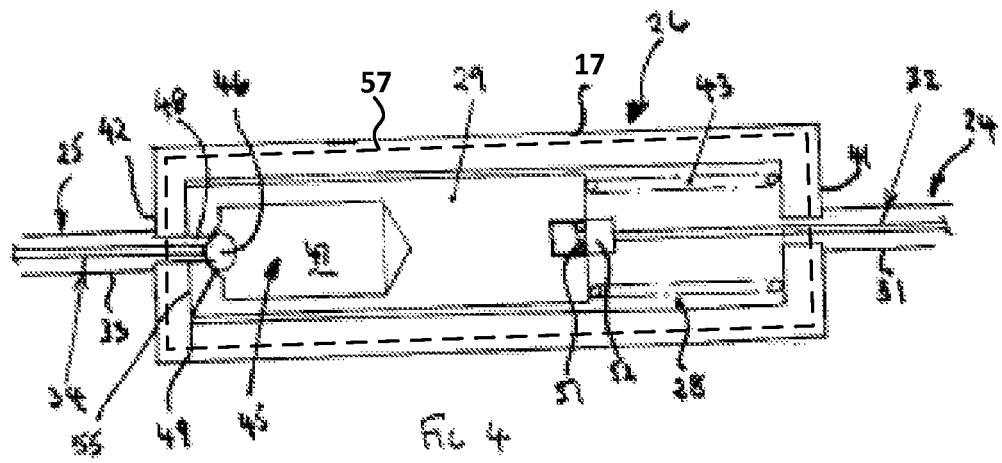
FIGS. 4-6 are schematic drawings of a connector also according to the present invention and shown in different operating modes corresponding with the different modes shown in FIGS. 1-3, and also showing alternative connections between the slider and actuator traction cord.
Figure 5:
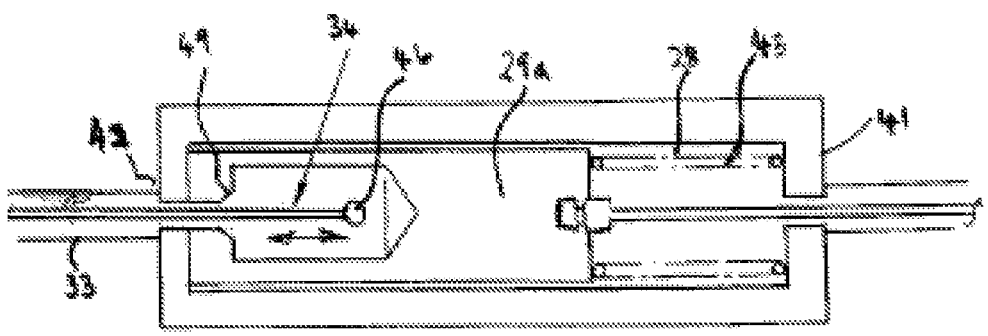
Figure 6:
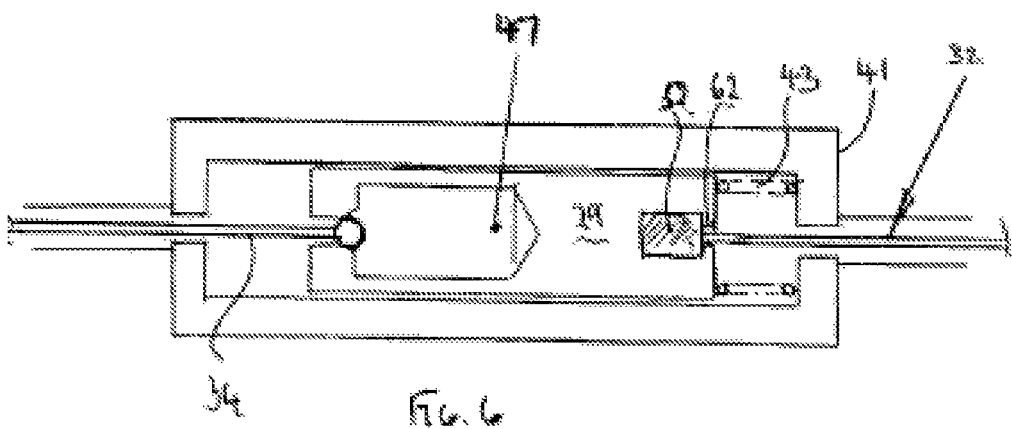

With reference also to FIGS. 4-6, the EPR cable assembly 20 comprises a control cable system having two Bowden cables 24,25 each comprising a respective sleeve 31,33 and inner traction cord 32,34 as is well known, with a cable connector 26 interconnecting the two traction cords 32,34. One Bowden cable 24 has its inner cord 32 connected to the control actuator 21 and the second cable 25 has its inner cord 34 connected to the release lever 12. The outer sleeve 33 of cable 25 is secured to the transmission case adjacent to the release lever 12 with a bracket 17. The outer sleeve 31 of cable 24 will be similarly secured adjacent the actuator 21. The bracket 17 reacts the forces in the cable system when actuator 21 pulls lever 12. The connector 26 permits limited linear movement of said second traction cord 34 connected to the lever 12 without transmission of said linear movement to said one traction cord 32 connected to the control actuator 21. The connector 26 also transmits linear movement of said one traction cord 32 to said second traction cord 33 when the control lever 21 is operated.

The connector 26 comprises an elongate body 27 with a longitudinally extending recess therein 28 with opposed abutment surfaces 41, 42 on the external end faces of the body for engagement with the respective sleeves 31,33 of the two cables 24,25 such that the body 27 holds the two sleeves 31,33 in fixed relationship. The two traction cords 32,34 are connected by a connecting device 29 comprises a slider having one end portion fixed to the first traction cord 32. The slider 29 is reciprocable within the recess 28 and is biased away from abutment surface 41 and the sleeve 31 of said one cable 24 by a spring 43. The spring 43 arranged in the recess to act between slider 29 and one end of the recess and is concentric with said one traction cord 32. The slider 29 at its other end portion engages with the second traction cord 34 via a lost motion connection 45. The lost motion connection 45 is provided by a fixing 46 attached to the end of the second traction cord 34 loosely engaging within a blind cavity 47 formed within the other end portion of the slider 29 adjacent the second abutment surface 42 and the sleeve 33 of the second cable 25.

The blind cavity 47 extends longitudinally of the slider 29 allowing longitudinal movement of the fixing 46 within the cavity 47 which has a passageway 48 at its open end to accommodate the second traction cord 34 and a detent 49 which in use engages with the fixing 46 on the cord 34 to transmit movement of the cord 32 to the cord 34 when the lever 21 is operated, as is shown in FIG. 6. The detent 49 comprises a shoulder formed around the inner end of the passageway.

The slider 29 at its other end portion may be provided with a detent 51 which engages a fixing 52 attached to the end of the first traction cord 32. The detent 51 may engage the fixing 52 so that the fixing 52 in part is external of the slider as shown. Alternatively, the slider 29A may be formed directly onto the second traction cord, see FIG. 5. In yet another embodiment shown in FIG. 6, the slider 29 may be provided by a further cavity 61 which snugly engaging the fixing 52 attached to the end of the first traction cord 32 with a further passageway 62 accommodating the traction cord 32.

The body 27 of the connector 26 may be formed from an engineering plastics material such as a polyamide, e.g. nylon 66 or a glass filled nylon 6 or 66. The body comprises a coffin-like body having a removable lid 57 to facilitate attachment of the traction cords to the slider. The slider 29 is preferably formed from a metal, preferably by die casting and the fixing 46 and 52 are conventional fittings or nipples crimped or soldered to the traction cords. Alternatively, fixing 46 can be cylindrical and fixing 52 can be spherical or any other bulbous shape.

FIG. 4 shows the connector 26 with the transmission in park mode and the actuator lever 21 'at-rest' as shown in FIG. 1. The spring 43 biases the slider 29 to the end 55 of the recess 28 adjacent the second abutment surface 42. The release lever 12 has moved the second traction cord 34 so that its fixing 46 is in abutment with shoulder 49.

With the transmission 11 in drive mode and the actuator lever 21 'at-rest' as shown in FIG. 2, the slider is still biased by spring 43 to the end 55 of the recess 28 adjacent the abutment surface 42. The release lever 12 has been rotated backwards by the transmission 11 moving the traction cord in the direction towards the first abutment surface 41 so that the second fixing 46 is moved inwardly away from the shoulder 49 typically by a distance of between 10-15 mm, as is shown in FIG. 5. The drag on the second traction cable will depend on its length, materials, lubrication etc. and typically is about 0.5N.

With the electrical power off, the EPR system is operated by the actuator lever 21 effecting a pull on the first traction cord 32 pulling the slider 29 against the bias of the spring 43 towards the first abutment surface 41. The movement of the slider 29 is transmitted to the second traction cord 34 causing the release lever 12 to move backwards as shown in FIG. 3 and FIG. 6.

The connector 26 thus facilitates the movement of the second traction cord with the release lever 12 during normal operation of the transmission whilst providing a manual emergency release for the transmission parking system when necessary.

With reference now to FIG. 7 there is shown a second embodiment of the connector 126 which is substantially similar to the connector 26 and the same reference numbers will be used for similar or identical components. The connector body 127 comprises male/female parts where one connector part 128, preferably the male part, contains the slider 29, spring 43 and cable assembly 24, and the other connector part 129, preferably the female connector part accommodates the cable assembly 25. The two connector parts 128,129 are sealed by seals 130 to prevent ingress of foreign matter.

The female part 129 comprises a central spigot 131 having a channel 132 to accommodate the inner cord 34 and a surrounding cap 133. The cap is use connects to a flange 134 on the external surface of the male part 128. As before the inner traction cable 34 connects to slider 29 through a lost motion connection 45.

The invention claimed is:

1. A cable connector for interconnecting two Bowden cables, including a first cable in use being connected to an actuator and a second cable in use being connected to a slave device, each of the first and second cables comprising a sleeve and inner traction cord, the connector in use holding the sleeves of the first and second cables in a fixed relationship relative to each other with the traction cords of the first and second cables being interconnected via a connecting device which constrains the traction cord of the second cable to permit limited linear movement of the traction cord of the second cable in one direction without transmission of the linear movement and without transmission of force from the traction cord of the second cable to the traction cord of the first cable during the limited linear movement of the traction cord of the second cable in the one direction,
   wherein the connecting device transmits linear movement from the traction cord of the first cable to the traction cord of the second cable in the one direction, and
   wherein the connecting device comprises:
      an elongate body with a longitudinally extending cavity therein, wherein the body holds the sleeves of the first and second cables in a fixed relationship;
      a slider fixed to the traction cord of the first cable, wherein the slider is reciprocable within the cavity, the slider engaging the traction cord of the second cable via a lost motion connection; and
      a spring arranged in the cavity between the slider and an interior surface of the cavity adjacent to the sleeve of the first cable to bias the slider away from the sleeve of the first cable.

2. A connector as claimed in claim 1, wherein the elongate body includes abutment surfaces for engagement with the sleeves of the first and second cables such that the body holds the sleeves of the first and second cables in fixed relationship.

3. A connector as claimed in claim 2, wherein the spring is arranged in the cavity coaxially with the slider and concentrically of the traction cord of the first cable.

4. A connector as claimed in claim 3, wherein the slider is provided in its end portion adjacent the sleeve of the second cable with a longitudinally extending blind cavity having a passageway accommodating the traction cord of the second cable and a detent configured to register with a fixing attached to the adjacent end of the traction cord of the second cable.

5. A connector as claimed in claim 4 wherein the detent comprises a shoulder formed around the inner end of the passageway.

6. A connector as claimed in claim 4 wherein the slider is provided at its end portion opposite the sleeve of the second cable with a further passageway accommodating in use the traction cord of the first cable and a further cavity for securing a fixing attached to the end of the traction cord of the first cable to the slider.

7. A connector as claimed in claim 4 wherein the slider is formed directly onto the traction cord of the second cable.

8. A connector as claimed in claim 2, wherein the body comprises a removable portion for the attachment of the traction cords of the first and second cables to the slider.

9. A connector as claimed in claim 8, wherein the removable portion is a female portion, wherein the body comprises a male portion having one abutment surface thereon and housing the slider, and the female portion having the second abutment surface thereon.

10. A connector as claimed in claim 2,
    wherein the body includes a male part and a female part that, when separate, facilitate attachment of the traction cords of the first and second cables to the slider,
    wherein the male part forms the longitudinally extending cavity of the body and contains the slider,
    wherein the male part includes the abutment surface for engagement with the sleeve of the first cable,
    wherein the female part includes the abutment surface for engagement with the sleeve of the second cable,
    wherein the male part includes a channel for the traction cord of the first cable, and
    wherein the female part includes a channel for the traction cord of the second cable.

11. A connector as claimed in claim 10,
    wherein the male part includes a flange on its external surface,
    wherein the female part includes a cap that connects to the flange on the external surface of the male part to secure the male part to the female part.

12. A control cable system comprising:
    two Bowden cables, including a first cable being connected to an actuator and a second cable being connected to a slave device, wherein each of the first and second cables comprises a sleeve and inner traction cord; and
    a cable connector interconnecting the first and second cables,
    wherein the cable connector comprises a connecting device,
    wherein the cable connector holds the sleeves of the first and second cables in a fixed relationship relative to each other with the inner traction cords of the first and second cables being interconnected via the connecting device which constrains the traction cord of the second cable to permit limited linear movement of the traction cord of the second cable in one direction without transmission of the linear movement and without transmission of force from the traction cord of the second cable to the traction cord of the first cable during the limited linear movement of the traction cord of the second cable in the one direction,
    wherein the connecting device transmits linear movement from the traction cord of the first cable to the traction cord of the second cable in the one direction, and
    wherein the connecting device comprises:
       an elongate body with a longitudinally extending cavity therein, wherein the body holds the sleeves of the first and second cables in a fixed relationship;
       a slider fixed to the traction cord of the first cable and which is reciprocable within the cavity, the slider engaging the traction cord of the second cable via a lost motion connection; and
       a spring arranged in the cavity between the slider and an interior surface of the cavity adjacent to the sleeve of the first cable to bias the slider away from the sleeve of the first cable.

13. An emergency park release cable assembly for a motor vehicle having an automatic transmission, the emergence park release cable assembly comprising:
    two Bowden cables, including a first cable being connected to an actuator and a second cable being connected to a slave device, wherein each of the first and second cables comprises a sleeve and inner traction cord; and
    a cable connector interconnecting the first and second cables, wherein the cable connector comprises a connecting device, wherein the cable connector holds the sleeves of the first and second cables in a fixed relationship relative to each other with the inner traction cords of the first and second cables being interconnected via the connecting device which constrains the traction cord of the second cable to permit limited linear movement of the traction cord of the second cable in one direction without transmission of the linear movement and without transmission of force from the traction cord of the second cable to the traction cord of the first cable during the limited linear movement of the traction cord of the second cable in the one direction, wherein the connecting device transmits linear movement from the traction cord of the first cable to the traction cord of the second cable in the one direction, and wherein the connecting device comprises:
  an elongate body with a longitudinally extending cavity therein, wherein the body holds the sleeves of the first and second cables in a fixed relationship;
  a slider fixed to the traction cord of the first cable and which is reciprocable within the cavity, the slider engaging the traction cord of the second cable via a lost motion connection; and
  a spring arranged in the cavity between the slider and an interior surface of the cavity adjacent to the sleeve of the first cable to bias the slider away from the sleeve of the first cable.

14. A release system for disengaging the park mode of an automatic transmission of a motor vehicle and comprising:
  a release lever on the transmission and which is rotatable between park mode engaged and disengaged conditions,
  a control actuator, and
  an emergency release cable control assembly connecting the control actuator to the release lever,
  wherein the emergency release cable control assembly comprises:
    two Bowden cables, including a first cable being connected to the control actuator and a second cable being connected to the release lever, wherein each of the first and second cables comprises a sleeve and inner traction cord; and
    a cable connector interconnecting the first and second cables,
    wherein the cable connector comprises a connecting device,
wherein the cable connector holds the sleeves of the first and second cables in a fixed relationship relative to each other with the inner traction cords of the first and second cables being interconnected via the connecting device which constrains the traction cord of the second cable to permit limited linear movement of the traction cord of the second cable in one direction without transmission of the linear movement and without transmission of force from the traction cord of the second cable to the traction cord of the first cable during the limited linear movement of the traction cord of the second cable in the one direction, wherein the connecting device transmits linear movement from the traction cord of the first cable to the traction cord of the second cable in the one direction, and wherein the connecting device comprises:
  an elongate body with a longitudinally extending cavity therein, wherein the body holds the sleeves of the first and second cables in a fixed relationship;
  a slider fixed to the traction cord of the first cable and which is reciprocable within the cavity, the slider engaging the traction cord of the second cable via a lost motion connection; and
  a spring arranged in the cavity between the slider and an interior surface of the cavity adjacent to the sleeve of the first cable to bias the slider away from the sleeve of the first cable.

15. A cable connector for interconnecting two Bowden cables, including a first cable and a second cable, each of the first and second cables comprising a sleeve and inner traction cord, the cable connector comprising:
  a body with a longitudinally extending cavity therein, and with abutment surfaces for engagement with the sleeves of the first and second cables such that the body holds the sleeves of the first and second cables in a fixed coaxial relationship;
  a slider within the longitudinally extending cavity of the body, the slider being reciprocable within the cavity, the slider being configured to secure a fixing attached to the adjacent end of the traction cord of the first cable to the slider, the slider further including a longitudinally extending blind cavity having a passageway configured to constrain a fixing attached to the adjacent end of the traction cord of the second cable to permit limited linear movement of the traction cord of the second cable in one direction without transmission of the linear movement and without transmission of force from the traction cord of the second cable to the traction cord of the first cable during the limited linear movement of the traction cord of the second cable in the one direction; and
  a spring within the longitudinally extending cavity of the body between the slider and an end of the cavity adjacent to the sleeve of the first cable, wherein the spring biases the slider towards an end of the cavity adjacent to the sleeve of the second cable.

16. A connector as claimed in claim 15, wherein the body includes a removable lid to facilitate attachment of the traction cords of the first and second cables to the slider.

17. A connector as claimed in claim 15, wherein the body includes a male part and a female part that, when separate, facilitate attachment of the traction cords of the first and second cables to the slider.

18. A connector as claimed in claim 17,
  wherein the male part forms the longitudinally extending cavity of the body and contains the slider and the spring,
  wherein the male part includes the abutment surface for engagement with the sleeve of the first cable,
  wherein the female part includes the abutment surface for engagement with the sleeve of the second cable,
  wherein the male part includes a channel for the traction cord of the first cable, and
  wherein the female part includes a channel for the traction cord of the second cable.

19. A connector as claimed in claim 17,
  wherein the male part includes a flange on its external surface,
  wherein the female part includes a cap that connects to the flange on the external surface of the male part to secure the male part to the female part.

20. A cable connector for interconnecting two Bowden cables, including a first cable and a second cable, each of the first and second cables comprising a sleeve and inner traction cord, the cable connector comprising:
  a body with a longitudinally extending cavity therein, and with abutment surfaces for engagement with the sleeves of the first and second cables such that the body holds the sleeves of the first and second cables in a fixed coaxial relationship, wherein the body includes a male part and a female part that, when separate, facilitate attachment of the traction cords of the first and second cables to the slider, wherein the male part includes a flange on its external surface, wherein the female part includes a cap that connects to the flange on the external surface of the male part to secure the male part to the female part;

a seal between the male part and the female part to limit ingress of foreign matter within the cable connector;

a slider within the longitudinally extending cavity of the body, the slider being reciprocable within the cavity, the slider being configured to secure a fixing attached to the adjacent end of the traction cord of the first cable to the slider, the slider further including a longitudinally extending blind cavity having a passageway configured to constrain a fixing attached to the adjacent end of the traction cord of the second cable to permit limited linear movement of the traction cord of the second cable in one direction without transmission of the linear movement and without transmission of force from the traction cord of the second cable to the traction cord of the first cable during the limited linear movement of the traction cord of the second cable in the one direction; and a spring within the longitudinally extending cavity of the body between the slider and an end of the cavity adjacent to the sleeve of the first cable, wherein the spring biases the slider towards an end of the cavity adjacent to the sleeve of the second cable.

\* \* \* \* \*